(No Model.) 2 Sheets—Sheet 1.

R. F. ROSWALD.
APPARATUS FOR COOLING BEER.

No. 466,047. Patented Dec. 29, 1891.

(No Model.) 2 Sheets—Sheet 2.

R. F. ROSWALD.
APPARATUS FOR COOLING BEER.

No. 466,047. Patented Dec. 29, 1891.

UNITED STATES PATENT OFFICE.

RAYMOND F. ROSWALD, OF NEW YORK, N. Y.

APPARATUS FOR COOLING BEER.

SPECIFICATION forming part of Letters Patent No. 466,047, dated December 29, 1891.

Application filed December 15, 1890. Serial No. 374,703. (No model.)

*To all whom it may concern:*

Be it known that I, RAYMOND F. ROSWALD, of the city and county of New York, in the State of New York, have invented a new and useful Improvement in Apparatus for Cooling Beer, of which the following is a specification.

My invention relates to an improvement in apparatus for cooling beer, in which the beer is thrown into the cooling atmosphere in the form of spray.

A practical embodiment of my invention is represented in the accompanying drawings, in which—

Figure 1:
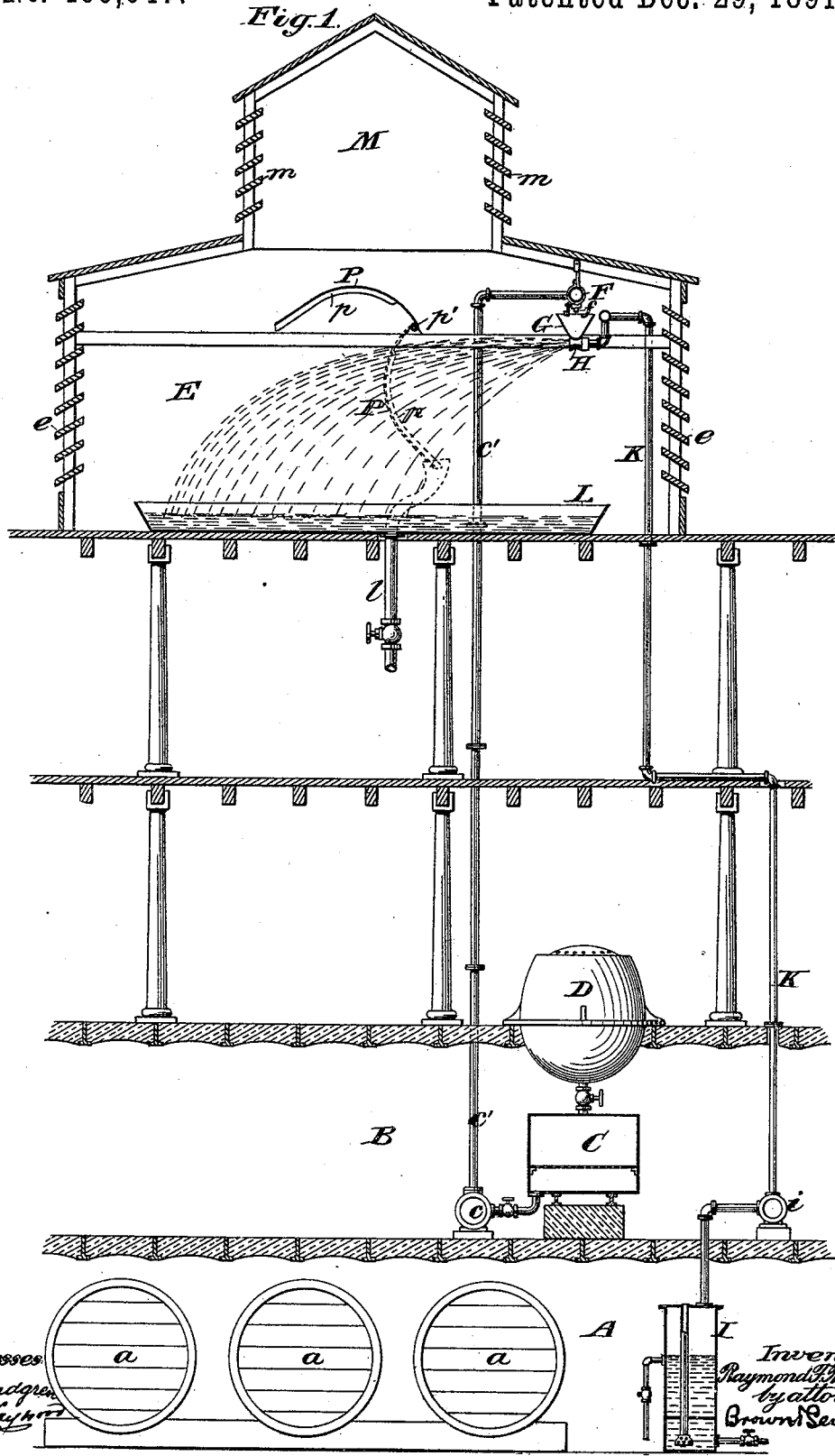
Figure 2:
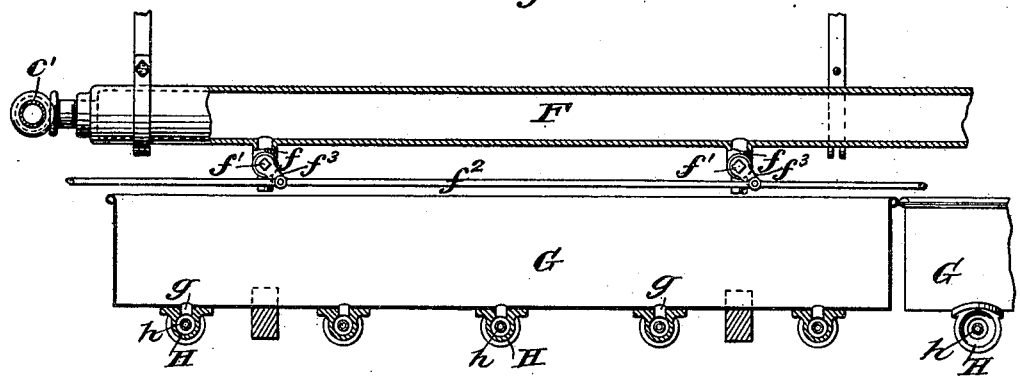
Figure 3:
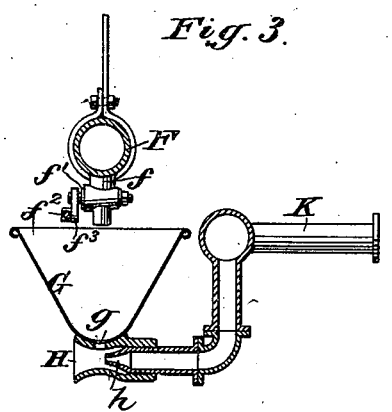

Figure 1 represents a portion of a brewery showing the apparatus in operative adjustment. Fig. 2 is an enlarged view in detail of a section through the delivery-pipe, receiving-trough, and spraying-nozzles; and Fig. 3 is an enlarged view in detail of a transverse section through the delivery-pipe, receiving-trough, and one of the spraying-nozzles.

A represents the cellar, in which the storage-casks $a$ are located, and from which air of a low degree of temperature may be obtained for cooling purposes.

B represents the compartment in which the hop-jack C is located, in position to receive the heated beer from an overhead kettle D, and from which the beer is drawn by a pump shown conventionally at $c$, and thence forced upwardly through a pipe $c'$ to the cooling-chamber E and into a delivery-pipe F, located in the upper portion of said cooling-chamber from which it may be delivered at pleasure through discharge-nozzles $f$ into a receiving-trough G. The discharge-nozzles $f$ are provided each with a stop-cock $f'$, which are conveniently operated simultaneously by an operating-rod $f^2$, connected with the operating-cranks $f^3$ for turning the cocks.

The bottom of the trough G is provided at suitable intervals with openings $g$, through which the beer in the trough is allowed to escape within the flaring-mouthed discharge-tube H and in front of the contracted nozzle $h$, through which air under pressure is forced. The air which is discharged into the beer through the nozzle $h$ is preferably obtained from the cellar A, where it is found at a low temperature, and is drawn through a purifier I by a pump shown conventionally at $i$, and is forced thence upwardly through a pipe K and distributed to the several nozzles $h$. As the beer falls from the trough into the flaring-mouthed tubes H in front of the nozzles $h$, the cool purified air is forced into contact with it and it is blown out of the said flaring mouths in the form of spray and received in a suitable receptacle L at the base of the cooling-chamber E, from which it is drawn through a suitable pipe $l$ to be further treated. In addition to the cooling effect of the purified air, which is blown into the beer to spray it, the said cooling-chamber is provided upon opposite sides with luffer-boarding $e$, by means of which a circulation of air is maintained throughout the chamber, and to further provide for the removal of the heated air from within the chamber I find it desirable to provide it with a dome M, the sides of which are formed of luffer-boarding $m$.

When the external atmosphere reaches a temperature so high as to render its effect within the cooling-chamber objectionable—as, for instance, in hot summer weather—the spray from the tubes H may be thrown against a dash-board P, and from thence conducted directly to the delivery-pipe $l$. For this purpose the dash-board may be formed of sheet metal curved in cross-section, as shown, and provided with troughs $p$ along its lower edges, which converge toward the pipe $l$. The board P may be suspended by suitable supports $p'$, so that it may be swung back and secured out of the way when not in use.

What I claim is—

1. In beer-cooling apparatus, a cooling-chamber the sides of which are open for the circulation of air therethrough, a distributing-trough located in the upper portion of the chamber, means for forcing the beer into the distributing-trough, spraying apparatus located beneath the distributing-trough, and a receptacle for the cooled beer, substantially as set forth.

2. In beer-cooling apparatus, a cooling-chamber, a distributing-trough located in said chamber, means for delivering beer to the distributing-trough, a sprayer located beneath the trough and directed transversely to the path of the liquid falling from the trough, an air-purifier, means for forcing the air from the purifier to the spraying apparatus, and a receptacle for the cooled beer, substantially as set forth.

3. In beer-cooling apparatus, a cooling-chamber provided with openings in its side through which a circulation of air is kept up, a distributing-trough supported within said chamber, means for forcing the beer into the distributing-trough, a series of sprayers in communication with the bottom of said distributing-trough, an air-purifier in communication with a cellar, means for forcing the air from the purifier into contact with the beer within the sprayers, and a receptacle for the cooled beer, substantially as set forth.

4. In beer-cooling apparatus, a cooling-chamber, a distributer located in said chamber, spraying apparatus in position to receive the beer from the distributer, means for forcing air to the spraying apparatus, and a dash-board adapted to receive the spray from the spraying apparatus, the said dash-board being provided with channels for directing the beer to the delivery-pipe, substantially as set forth.

RAYMOND F. ROSWALD.

Witnesses:
FREDK. HAYNES,
GEORGE BARRY.